United States Patent [19]

Johansson

[11] 4,123,658

[45] Oct. 31, 1978

[54] SELF-POWERED NEUTRON DETECTOR

[75] Inventor: Lars O. Johansson, Nyköping, Sweden

[73] Assignee: Aktiebolaget Atomenergi, Stockholm, Sweden

[21] Appl. No.: 776,424

[22] Filed: Mar. 10, 1977

[30] Foreign Application Priority Data

Mar. 12, 1976 [SE] Sweden ............................... 7603246

[51] Int. Cl.² .............................................. G01T 3/00
[52] U.S. Cl. ................................................. 250/390
[58] Field of Search ............... 250/390, 391, 392, 370; 313/61 D

[56] References Cited

U.S. PATENT DOCUMENTS 3,940,627 2/1976 Klar ....................................... 250/390

Primary Examiner—Alfred E. Smith
Assistant Examiner—Janice A. Howell
Attorney, Agent, or Firm—Burns, Doane, Swecker & Mathis

[57] ABSTRACT

The present invention provides a self-powered neutron detector in which the net contribution of current generated by external gamma radiation is largely equal to zero. A self-powered neutron detector comprises a centralized emitter core, an insulator surrounding the core, an electrically conductive collector surrounding the insulator, and a conduit connected to the emitter core and the collector for withdrawal of generated gamma current. A layer is positioned between the emitter core and the insulator which consists of a material having a high atomic number, a low neutron activation cross section, and a thickness of at most about 5 microns.

9 Claims, 3 Drawing Figures

SELF-POWERED NEUTRON DETECTOR

The present invention relates to an improved self-powered neutron detector having an emitter core surrounding by an insulator which in turn is surrounded by an electrically conductive collector, and conduit means connected to the emitter and the collector for withdrawal of current generated in the detector.

The present invention relates to self-powered neutron detectors which are used to indicate neutron radiation. In accordance with conventional technique, such neutron detector comprises a centrally positioned emitter surrounded by an insulating material which is in turn surrounded by an electrically conductive collector. The emitter consists of a conducting or semi-conducting material which spontaneously emits radiation when a neutron is absorbed therein. The insulator consists of a densely compacted dielectric material that retains a high electric resistivity even when continuously exposed to intense radiation. The collector consists of a conducting material which produces, to a minor extent, electrons or gamma rays in neutron radiation. The electrons emitted by the emitter pass to the collector and this electron current is measured as an indication of neutron flux. In the following discussion, the current resulting from flow of electrons from the emitter to the collector is regarded as positive.

Existing self-powered neutron detectors of the construction as described above are subject to the drawback that they are sensitive to external gamma radiation, which frequently results in misleading readings with regard to measured neutron flux levels. Under external gamma radiation charge displacements take place both from emitter to collector and in the opposite direction in view of Compton effect and photo effect. The total current is the difference between the outward current and the inward current, and in the ideal case the gamma-contribution is nil in that said two counter-currents are equally large.

In a self-powered neutron detector of a conventional type, wherein the emitter consists of for example cobalt or vanadium, the insulator consists of for example magnesia or aluminia, and the collector consists of an alloyed steel or Inconel, there is obtained a net contribution of external gamma radiation which is negative in relation to the current generated by the neutron radiation. Firstly, this results in the disadvantage that the neutron sensitivity of the detector is reduced and, secondly, the net contribution of gamma radiation varies with the intensity of the gamma radiation. These drawbacks are, of course, of an interfering character, since from detectors of this type a high operational safety is expected and also a correct measurement in relation to the actual neutron flux.

The present invention provides a self-powered neutron detector in which the net contribution of current generated by external gamma radiation is largely equal to zero. In connection with investigations carried out, it has unexpectedly been found that by arranging, between the emitter and the insulator, a layer consisting of a material having a high atomic number and a low neutron cross section and having a thickness of at most about 5 microns the desired effect may be obtained without concomitant decrease in efficiency of the neutron detector. In fact, the neutron sensitivity of the detector increases mainly in view of the fact that the prior art usually negative net contribution of external gamma radiation is eliminated, but also in view of the fact that said layer increases the probability of compton and photo electrons resulting from captured gamma radiation from the emitter material, which results in a positive contribution to the signal current.

The material of the layer positioned between emitter and insulator must not result in disturbing delayed single currents. The cross section for activation to instable isotopes shall, therefore, be low, suitably at most 5 barns. However, the total capture cross section may be higher, up to 30 times of that of the emitter material.

Suitable elements for said layer are bismuth, lead, platinum, osmium, hafnium, erbium, neodymium, cerium and palladium. Of these platina and the lanthanoides cerium, neodymium, erbium have particularly useful characteristics.

The thickness of the compensating layer is about 0.7 mg/cm$^2$ for an emitter of cobalt, which corresponds to about 0.35 microns if the layer material is platinum and the thickness does in no case with regard to other materials exceed 1.5 microns. The corresponding data for vanadium are about 1.5 mg/cm$^2$, 0.7 microns, and 2.5 microns, respectively.

In connection with investigations carried out it has been found that the thickness of the layer is critical in that a larger thickness involves over-compensation with regard to the net contribution of external gamma radiation so that said net contribution becomes positive. In fact it is surprising that such a small part of the surface layer of the emitter of only the order of 1 micron almost completely determines the sensitivity of the detector vis-a-vis gamma radiation.

The invention will now be further described by a non-limiting example in connection to the appended drawing, wherein.

Figure 1:
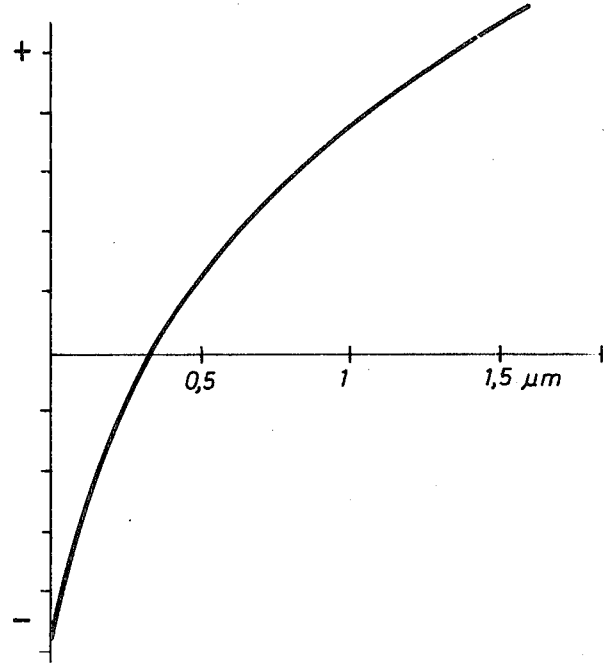
FIG. 1 shows the relation between layer thickness and gamma-sensitivity.
Figure 2:
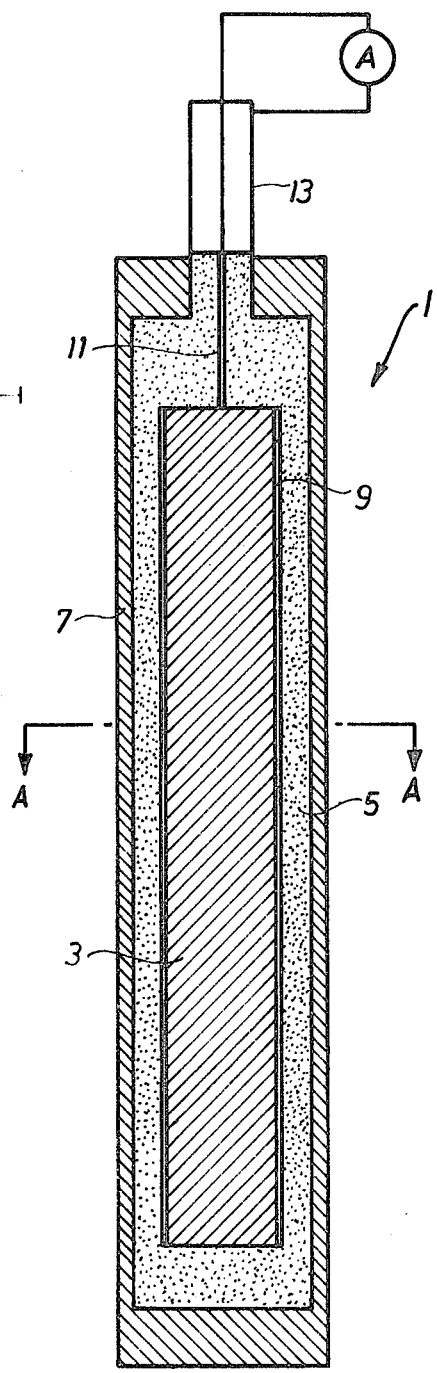
FIG. 2 shows a section of an embodiment of the invention.
Figure 3:
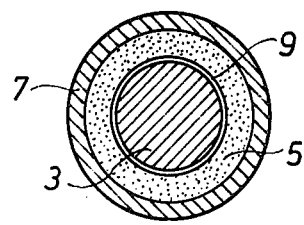
FIG. 3 shows a cross-section taken along line A—A of FIG. 2.

FIG. 1 shows the effect of a thin surface layer of an element having a high atomic number on an emitter having a low atomic number (in this case platinum on cobalt). It is also possible to utilize a heavy element, such as for example platinum or rhodium, as an emitter material, which then results in a positive gamma current. A layer of for example aluminium or magnesium or other element having a low atomic number on the emitter may then give compensation of the positive gamma current. A somewhat thicker layer is, however, required in this case (preferably some tens of microns).

Moreover, there is the possibility of arranging the compensating layer on the other electrode, i.e. on the interior surface of the collector.

According to the drawing the shown embodiment of the neutron detector, generally indicated 1, includes an emitter core 3, preferably made of cobalt, and having a cylindric configuration, the diameter thereof varying from about ½ to about 2 mms. The emitter core 3 is surrounded by a thin layer 9 of platinum, preferably having a thickness of about 0.35 microns.

Layer 9 is surrounded by an insulator 5 consisting of a layer of magnesia or alumina having a high density. The thickness of the insulator may vary between about 0.25 and 0.5 mm. Insulator 5 is in turn surrounded by an exterior collector 7 having a suitable thickness, for example 0.25 mm, and being made for example of an alloyed steel having a low content of manganese or a nickel alloy, such as Inconel.

An electric lead 11 is connected to emitter 3 through the insulator 5 and is carried as a central conductor of a coaxial cable, the sheath 13 of which is connected to collector 7, as indicated by dashed lines. Leads 11, 13 are connected to a low current level ammeter A, one end of which is grounded.

The self-powered neutron detector of this invention has a practically instantaneous response to change in neutron flux levels. This response makes the device particularly useful for utilization in safety systems. Since in addition thanks to layer 9, the gamma sensitivity of the detector is very low, not to say negligible, the detector is very reliable and for this reason preferred above prior art gamma-sensitive detectors.

It should be noted that the invention is in no way delimited to the specific embodiment described above, since various modifications and equivalents are obvious to those skilled in the art.

What is claimed is:

1. In a self-powered neutron detector comprising a centralized emitter core, an insulator surrounding said core, an outer collector in turn surrounding said insulator, and conduit means connected to said emitter core and collector for withdrawal of generated current, the improvement consisting of a layer positioned between the emitter core and the insulator which consists of a material having a high atomic number and a low neutron activation cross section and has a thickness of at most about 5 microns.

2. A neutron detector according to claim 1, wherein the emitter core consists of cobalt and wherein said material has a neutron activation cross section of at most about 5 barns.

3. A neutron detector according to claim 1, wherein the emitter core consists of vanadium, and wherein said material has a neutron activation cross section of at most about 5 barns.

4. Neutron detector according to claim 2, wherein said layer consists of platinum and has a thickness of at most about 0.5 micron.

5. Neutron detector according to claim 4, wherein the thickness of said layer is about 0.35 micron.

6. Neutron detector according to claim 3, wherein said layer consists of platinum and has a thickness of at most about 1 micron.

7. A neutron detector according to claim 6, wherein said layer has a thickness of about 0.7 micron.

8. In a self-powered neutron detector having a centralized emitter core, an insulator surrounding said core, an outer collector in turn surrounding said insulator, and conduit means connected to said emitter core and collector for withdrawal of generated current, the improvement comprising a layer of material selected from the group consisting of platinum, lead, bismuth, osmium, hafnium, erbium, neodymium, cerium or palladium positioned between the emitter core and the insulator said layer having a high atomic number, a low neutron activation cross section, and a thickness of at most about 5 microns.

9. Neutron detector according to claim 8, wherein said material is platinum, cerium, neodymium or erbium.

* * * * *